(12) United States Patent
Pacheco et al.

(10) Patent No.: US 12,085,199 B2
(45) Date of Patent: Sep. 10, 2024

(54) SEALING GASKET FOR DUCTILE IRON PIPE AND METHOD OF MANUFACTURE

(71) Applicant: S & B Technical Products, Inc., Fort Worth, TX (US)

(72) Inventors: Rodney Pacheco, Montes de Oca (CR); Guido Quesada, Santa Ana (CR); Bernal Rojas, San Rafael (CR); Bradford G. Corbett, Jr., Fort Worth, TX (US)

(73) Assignee: S & B Technical Products, Inc., Fort Worth, TX (US)

( * ) Notice: Subject to any disclaimer, the term of this patent is extended or adjusted under 35 U.S.C. 154(b) by 274 days.

(21) Appl. No.: 17/530,555

(22) Filed: Nov. 19, 2021

(65) Prior Publication Data

US 2022/0221090 A1    Jul. 14, 2022

Related U.S. Application Data

(60) Provisional application No. 63/117,667, filed on Nov. 24, 2020.

(51) Int. Cl.
  *F16L 21/03*    (2006.01)
(52) U.S. Cl.
  CPC ................... *F16L 21/03* (2013.01)
(58) Field of Classification Search
  CPC ..... F16J 15/102; F16J 15/104; F16L 37/0842; F16L 37/0845; F16L 37/0925; F16L 21/03
  See application file for complete search history.

(56) References Cited

U.S. PATENT DOCUMENTS

| | | | |
|---|---|---|---|
| 4,818,209 A * | 4/1989 | Petersson | B29C 57/025 277/924 |
| 5,197,768 A | 3/1993 | Conner | |
| 5,295,697 A | 3/1994 | Weber et al. | |
| 5,393,107 A * | 2/1995 | Vobeck | F16L 37/0925 285/322 |
| 5,464,228 A | 11/1995 | Weber et al. | |
| 7,815,225 B2 | 10/2010 | Jones et al. | |
| 8,235,427 B2 | 8/2012 | Jones et al. | |
| 8,925,977 B2 | 1/2015 | Holmes, IV et al. | |

(Continued)

OTHER PUBLICATIONS

Tyton Joint Pipe & Fittings; brochure; pp. 1 and 12-15; 2018 edition; U.S. Pipe.

*Primary Examiner* — Eugene G Byrd
*Assistant Examiner* — L. Susmitha Koneru
(74) *Attorney, Agent, or Firm* — Whitaker Chalk Swindle & Schwartz PLLC; Charles D. Gunter, Jr.

(57) ABSTRACT

A sealing gasket is shown which is used to seal the belled end opening of a female ductile iron pipe to a mating male pipe having an interior surface and an exterior surface. The sealing gasket has an annular gasket body made of a resilient elastomeric material which is bonded to a hard plastic reinforcing band. The annular gasket body is installed within a raceway provided in the mouth region of the female ductile iron pipe so that an outer circumferential region forms a seal with the female pipe mouth region and an inner circumferential region forms a sealing surface for the exterior surface of the mating male pipe. The reinforcing band has a circumferential body which is made of a synthetic polymer which has a greater hardness than the elastomeric material of the remainder of the gasket body.

7 Claims, 11 Drawing Sheets

(56) References Cited

U.S. PATENT DOCUMENTS

| | | | |
|---|---|---|---|
| 9,851,029 B2 * | 12/2017 | Jones | F16L 27/1017 |
| 10,352,486 B2 | 7/2019 | DeBoalt | |
| 10,876,672 B2 * | 12/2020 | Quesada | F16J 15/0818 |
| 11,118,710 B2 * | 9/2021 | Deboalt | F16L 17/03 |
| 2004/0140625 A1 * | 7/2004 | Valls, Jr. | F16L 21/03 |
| | | | 277/549 |
| 2012/0280497 A1 * | 11/2012 | Holmes, IV | F16L 37/0845 |
| | | | 285/379 |
| 2018/0245727 A1 * | 8/2018 | Quesada | F16J 15/0818 |

* cited by examiner

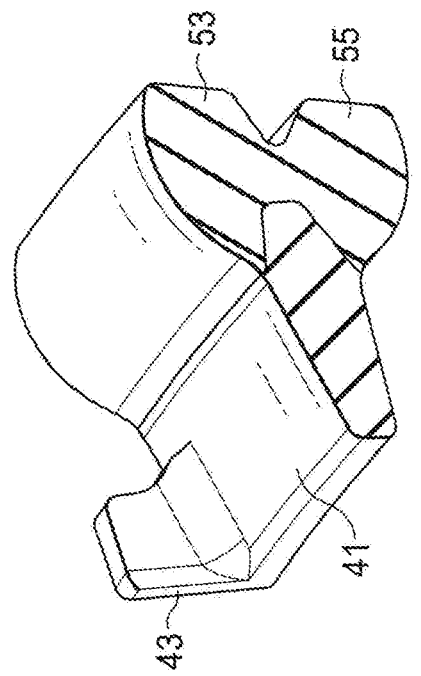
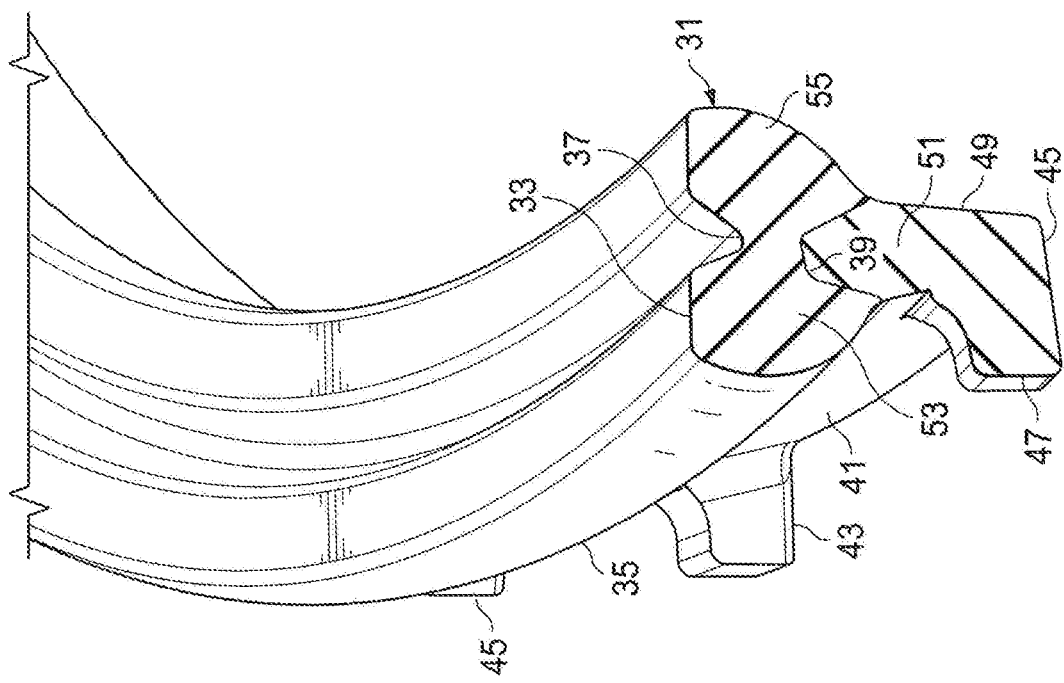

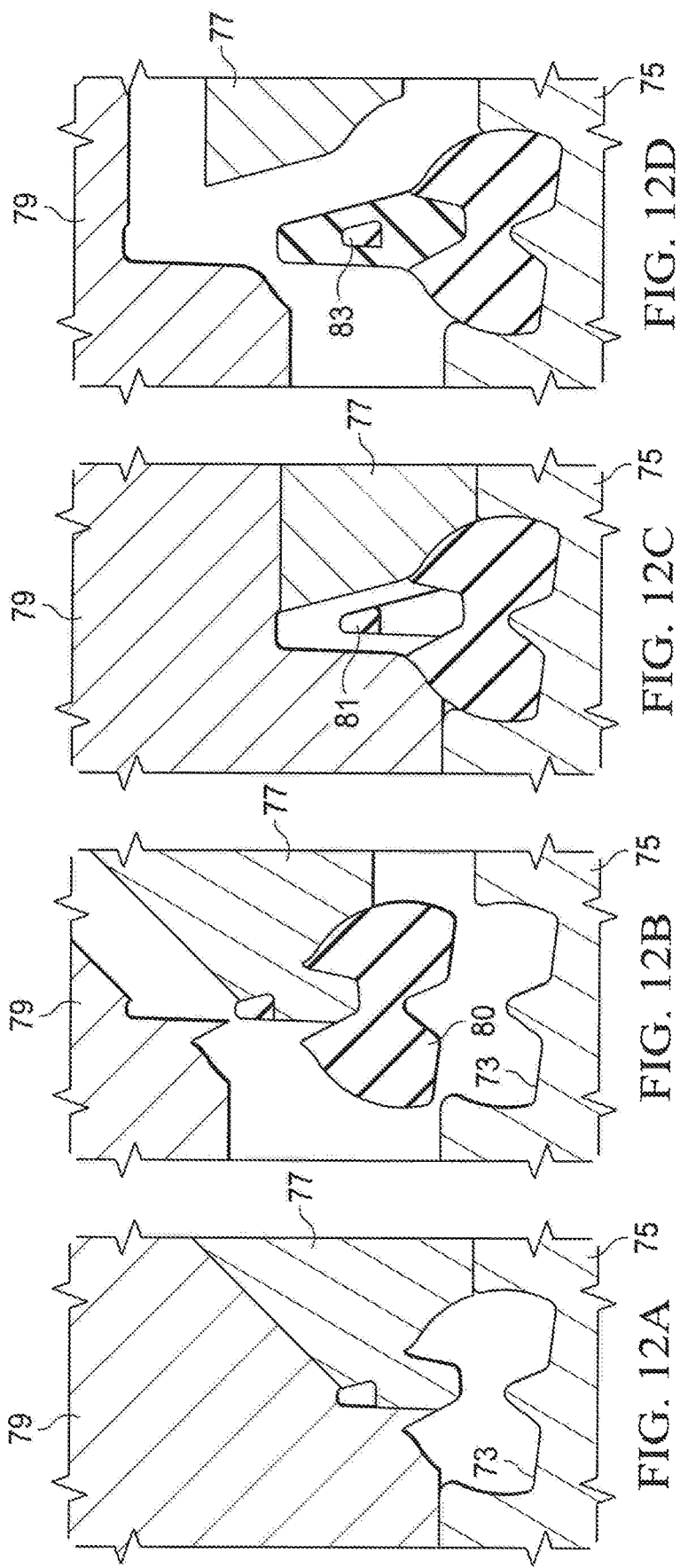

SEALING GASKET FOR DUCTILE IRON PIPE AND METHOD OF MANUFACTURE

BACKGROUND OF THE INVENTION

1. Field of the Invention

The present invention relates generally to the field of pipe connections such as those used in the municipal water and sewer pipeline industries. More particularly, this invention relates to a sealing gasket for use in joining sections of ductile iron pipe used in such industries and to a method for manufacturing such a gasket.

2. Background of the Invention and Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

In many applications where lengths of pipe are joined in telescoping relationship, the spigot end of one pipe is inserted into the socket end of the engaging pipe at a pipe joint or "coupling." The socket end has an opening large enough to receive the spigot end of the mating pipe. A gasket is typically present within the socket end of the pipe which is intended to prevent leakage of fluid from the joint by forming a seal between the two pipe sections. Piping systems of the above type also typically include "fittings" as that term is defined in the industry. A fitting is a term which will be familiar to those in the relevant industries and includes a piece, often curved or at an angle, as a coupling, an elbow, a valve, a Tee, etc. used for connecting lengths of pipe or as an accessory to a pipe in a piping system for conveying fluids.

One important consideration in piping systems of the above type, whether in a straight run of pipe or at a fitting, is to provide adequate sealing at the pipe joints or couplings. In the case of ductile iron pipe installations, the sealing gasket must often perform in extreme circumstances in maintaining a proper seal at the pipe joints or couplings. Whereas the allowable clearance or raceway present between a female belled plastic pipe end and a mating male plastic spigot pipe end might be on the order of 5.5 mm, the same clearance or raceway in a ductile iron pipe system might be appreciably greater. This is due, at least in part, to the difference in manufacturing tolerances and techniques utilized in manufacturing the two types of pipe. Because of the difference in dimensional tolerances which are present in ductile iron pipe systems, it would be desirable to provide some type of mechanism to prevent the gasket from blowing out of the groove provided in the belled pipe end during use. The mechanism used to prevent blow-outs of this type should also be such that it does not interfere with bending of the gasket during initial insertion of the gasket into the sealing groove provided in the belled pipe end.

One gasket used for many years in the ductile pipe industry is the so-called Tyton® gasket produced by U.S. Pipe and Foundry Company of Birmingham, Alabama, USA. This gasket is advertised as being used in U.S. Pipe's Tyton® Joint and HP LOK® Joint Ductile Iron Pipe and Fittings. It is a circular rubber gasket which has a modified bulb shape in cross section. All conventional Tyton® gaskets are made from vulcanized synthetic rubber with a soft rubber bulb and a harder heel joined in a strong, vulcanized band. The standard rubber compound is SBR, i.e., styrene butadiene rubber. This material has a maximum service temperature rating of 150° F. and is commonly used as a gasket material for drinking water, sanitary sewer applications, and the like.

While the Tyton® gasket has been successfully used for many years, it would be desirable to provide a gasket for ductile iron pressure pipes which would be less expensive to produce by generating a new slim seal shape which reduces the volume of rubber required as much as possible.

A need exists, accordingly, for an improved sealing gasket for ductile iron pipelines which includes special features which insure that it will not be blown out of its associated retaining groove under high pressure situations.

A need also exists for such an improved sealing gasket for ductile iron pipelines which is cost-effective, easy to manufacture and easy to use in the field and which is dependable in operation.

SUMMARY OF THE INVENTION

Accordingly, the present invention has as one object to provide an improved sealing gasket for insertion within an annular groove within a mouth region located adjacent an end opening of a belled end of a ductile iron pipe section which is capable of sealing the belled ductile iron pipe end to a mating male pipe having an interior surface and an exterior surface.

The new gasket would replace the classic Tyton® shape with a less expensive design by developing a new slim seal design, reducing the rubber volume as much as possible, and by replacing the current dual-durometer rubber configuration with a hard plastic, softer rubber combination, such as a polypropylene-EPDM bonded combination.

The sealing gasket of the invention is designed for insertion within an annular groove or raceway provided within a mouth region located adjacent a belled end opening of a female ductile iron pipe and is capable of sealing the female ductile iron pipe to a mating male pipe having an interior surface and an exterior surface. The sealing gasket has an annular gasket body made of a resilient elastomeric material, the annular gasket body having an inner circumferential region and an outer circumferential region which form a pair of lobes, as viewed in cross-section, lobes being partly separated by an insertion force reduction notch. The gasket body also has a circumferential groove for receiving a mating circumferential reinforcement band. The annular gasket body is installed within the annular groove provided in the mouth region of the female ductile iron pipe so that the outer circumferential region forms a seal with the female pipe mouth region and the inner circumferential region forms a sealing surface for the exterior surface of the mating male ductile iron pipe.

The mating reinforcing band has a circumferential body which is made of a synthetic polymer which has a greater hardness than the elastomeric material of the remainder of the gasket body. The circumferential reinforcing band has a plurality of rigid tabs which extend outwardly from the circumferential body of the band at a predetermined spacing which extends around the circumference of the body of the band.

In one preferred form, the resilient elastomer used to form the annular gasket body is an EPDM rubber. The mating reinforcing band can be formed of a synthetic polyolefin, such as polypropylene. This choice of materials, as well as the other design aspects of the new gasket, can provide substantial savings in material costs alone. The sealing gasket has an overall seal volume and wherein the overall seal volume represents on the order of a 40% reduction in volume, or more, and consequently reduction in material cost, over a traditional Tyton® gasket commonly used in ductile iron pipe joints.

One reason for choosing the EPDM/PP combination is their chemical affinity which helps with bonding. However, other combinations of similar materials, plus the use of mechanical interlocking, may be used as well, as will be more fully described.

The raceway provided within the mouth region located adjacent the belled end opening of the female ductile iron pipe has two regions of increased diameter separated by a region of lesser diameter, giving the raceway a dual pocket appearance when viewed in cross-section. The outer circumferential region of the gasket body fits in one pocket and the tabs of the reinforcing ring are received in the other respective pocket when the gasket is assembled in the raceway. The body of the reinforcing band also has a rearwardly extending body portion which is received and bonded within the circumferential groove of the gasket body. The increased height of the rearwardly extending body portion serving to help prevent extrusion of the sealing gasket under pressure.

In one embodiment, the annular gasket body is chemically bonded to the reinforcing ring.

In another embodiment, the reinforcing ring is mechanically interlocked with the annular gasket body with no chemical bonding.

A method for manufacturing a sealing gasket is also shown, the gasket being designed for insertion within an annular groove or raceway provided within a mouth region located adjacent a belled end opening of a female ductile iron pipe and being capable of sealing the female ductile iron pipe to a mating male pipe having an interior surface and an exterior surface. The steps in the method include:
  stretching and placing a cooled down, previously molded and cured rubber gasket body as an insert in a bottom plate of a plastic mold;
  closing a middle and top plate on the mold bottom plate of the plastic mold to form a cavity for plastic injection;
  injecting a relatively harder synthetic plastic material into the cavity and allowing the synthetic plastic material to chemically bond with the previously injection molded rubber gasket body;
  separating the mold bottom, middle and top plates and ejecting a finished part;
  wherein the finished part has an annular gasket body made of a resilient elastomeric material, the annular gasket body having an inner circumferential region and an outer circumferential region which form a pair of lobes, as viewed in cross-section, lobes being partly separated by an insertion force reduction notch, the gasket body also having a circumferential groove for receiving a mating circumferential reinforcement band, the annular gasket body being installed within the raceway provided in the mouth region of the female ductile iron pipe so that the outer circumferential region forms a seal with the female pipe mouth region and the inner circumferential region forms a sealing surface for the exterior surface of the mating male ductile iron pipe;
  wherein the reinforcing band has a circumferential body which is made of a synthetic polymer which has a higher durometer hardness than the elastomeric material of the remainder of the gasket body;
  wherein the circumferential reinforcing band has a plurality of rigid tabs which extend outwardly from the circumferential body of the band at a predetermined spacing which extends around the circumference of the body of the band.

Additional objects, features and advantages will be apparent in the written description which follows.

BRIEF DESCRIPTION OF THE DRAWINGS

FIG. 2 is a partial, isolated view of a sealing gasket of the invention showing the regions of varying hardness in cross-section.

FIG. 3 is partial sectional view of the sealing gasket of FIG. 2.

FIGS. 12A-13 are additional views of an alternative molding operation used to produce another version of the gasket of the invention in which the regions of varying hardness are mechanically interlocked to one another, rather than being chemically bonded or fused.

DETAILED DESCRIPTION OF THE INVENTION

Figure 1:
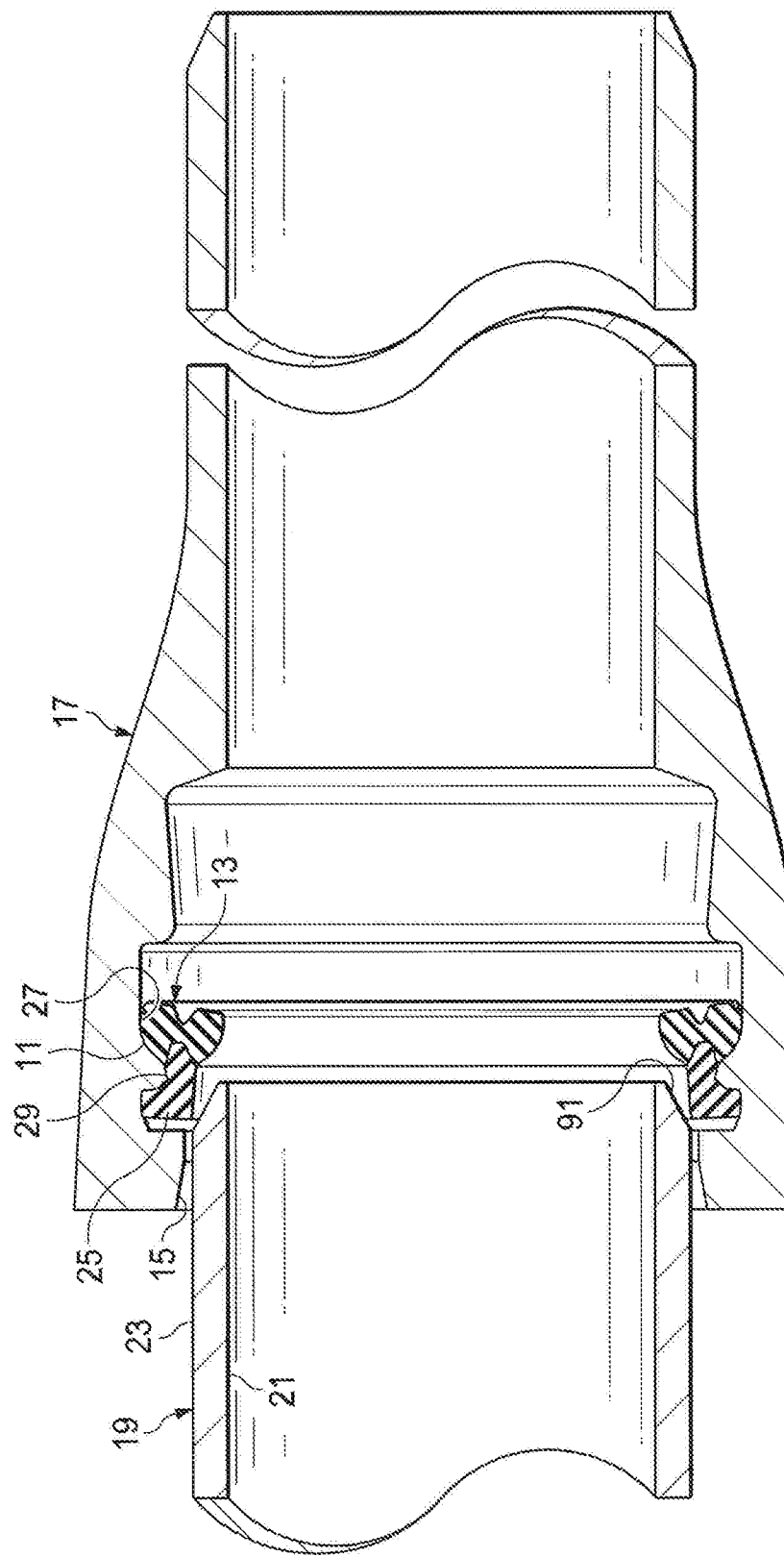
FIG. 1 is a partial, side cross-sectional view of the female end of a section of ductile iron pipe with a sealing gasket of the invention installed therein and with the mating male pipe end being moved into position to make up the pipe joint.
Figure 4:
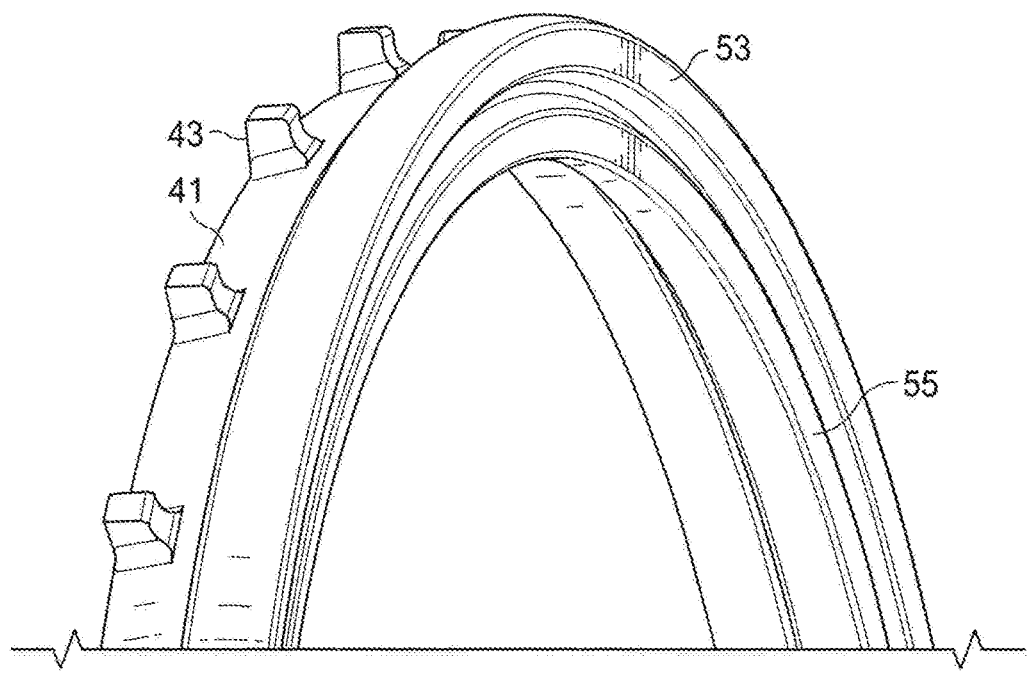
FIG. 4 is a partial perspective view of the sealing gasket of FIG. 2.
Figure 5:
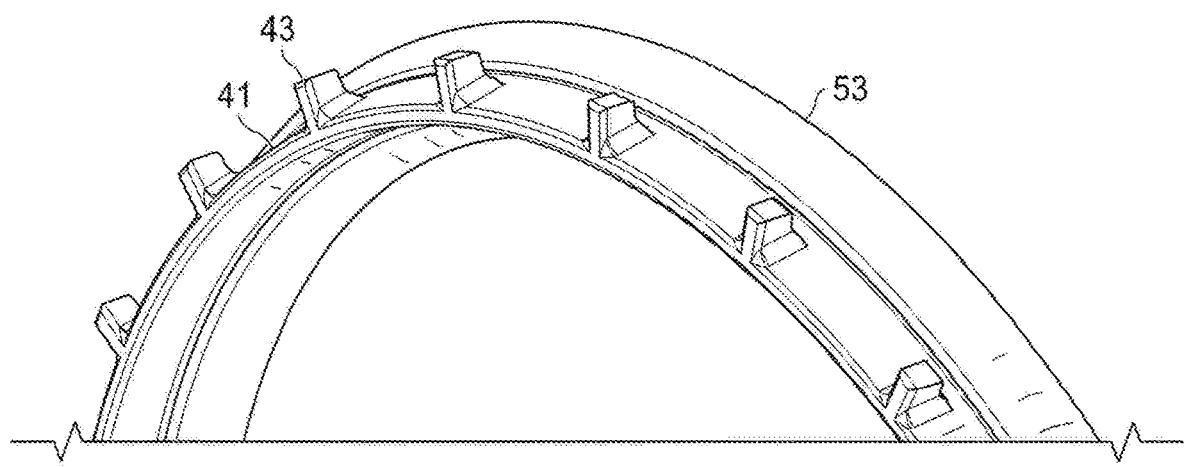
FIG. 5 is another partial perspective view of the gasket of the invention, similar to FIG. 4, but viewed from a different angle.
Figure 6:
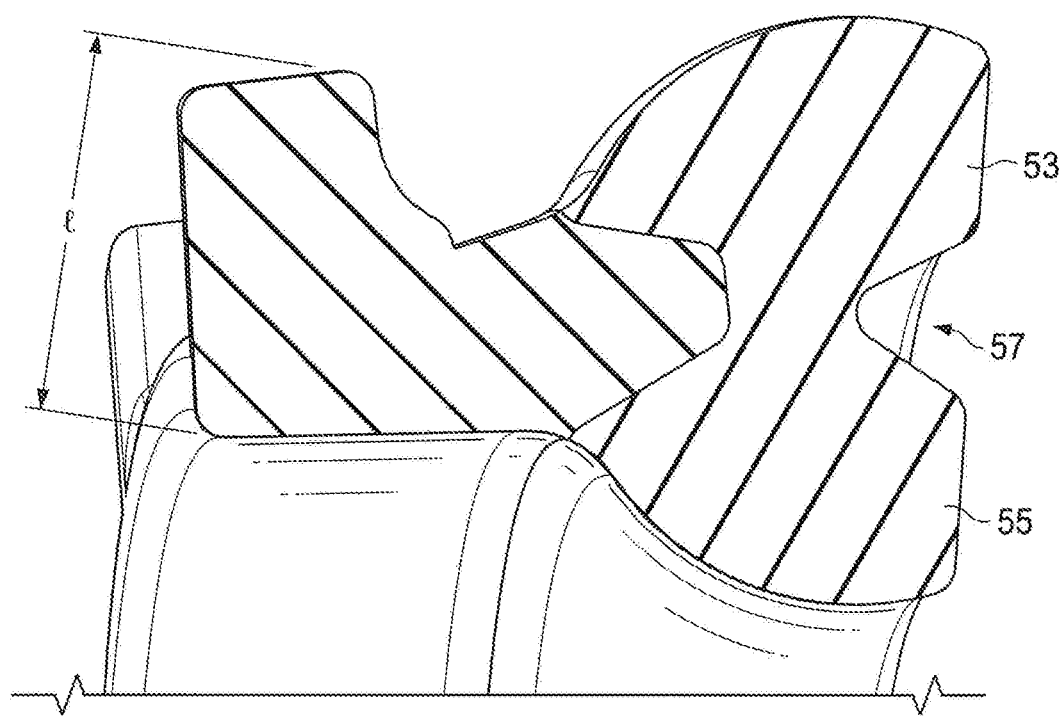
FIG. 6 is another cross-sectional view of a section of the gasket of the invention, shown close-up for ease of illustration.

The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

The present invention deals with piping systems of the type used in water, sewage and other municipal fluid conveyance systems. For many years, such pipelines have traditionally been formed of a ferrous metal. By "ferrous metal" is meant iron and alloys of iron. For example, one type of ferrous metal which is commonly encountered in the water works industry is "ductile iron." This particular type of metal is widely used because it offers a combination of a wide range of high strength, wear resistance, fatigue resistance, toughness and ductility in addition to the well-known advantages of cast iron-castability, machinability, damping properties and economy of production. It takes its name from the fact that it is "ductile" in nature, rather than being brittle, as was the case with earlier cast iron products and materials. Today, grades of ductile iron are available offering the option of choosing high ductility with grades guaranteeing more than 18% elongation, or high strength, with tensile strengths exceeding 120 ksi (825 MPa). Austempered ductile iron (ADI), offers even greater mechanical properties and wear resistance, providing tensile strengths exceeding 230 ksi (1600 Mpa).

In forming a pipeline of ductile iron components, one end of each section is typically enlarged, forming a female "bell" at one end sufficient to join the next adjacent pipe section by receiving in the belled end the unenlarged or male "spigot" end of the next adjacent length of pipe within the bell end opening. The inside diameter of the bell is formed sufficiently large to receive the spigot of the next section of pipe with sufficient clearance to allow the application of an elastomeric gasket or other sealing device designed to prevent leakage at pipe joints when a plurality of pipe lengths are joined to form a pipeline.

Straight runs of ductile iron pipe of the above type have, for many years, been joined by utilizing an elastomeric gasket which is compressed between the inside walls of the bell and the outside wall of a mating spigot end of the next pipe in a series of telescoped pipes. The gasket is typically retained within the groove or raceway provided in the bell end opening of the female pipe section. However, especially in very high pressure field applications, it sometimes happens that the gasket is "blown out" of the bell.

While the improved gasket of the invention is intended to be used in ductile iron pipe systems, those skilled in the relevant arts will be familiar with other types of pipeline materials. For example, in some pipeline systems, the mating male pipe may be formed of another material, such as a suitable plastic such as PVC or a suitable polyolefin such as polyethylene. Such "hybrid" systems are becoming increasingly common in use in the rehabilitation of existing ductile iron pipe lines. However, the gasket of the invention has particular application to ductile iron pipe systems because of the problem created by the manufacturing tolerances in the casting of sections of ductile iron pipe.

As discussed briefly in the "Background of the Invention", in ductile iron pipe installations the sealing gasket must often perform in extreme circumstances in maintaining a proper seal at the pipe joints or couplings. By way of example, the allowable clearance or raceway present in the joint or coupling between a female belled plastic pipe end and a mating male plastic spigot pipe end might be on the order of 5.5 mm. However, the same clearance or raceway in the coupling of a ductile iron pipe system will typically be noticeably greater. This is due, at least in part, to the difference in manufacturing tolerances and manufacturing techniques used in producing the two types of pipes, i.e., casting of ductile iron versus plastic extrusion.

Because of the greatly different tolerances involved in the joint or coupling of a ductile iron pipe system, it would be desirable to provide some type of mechanism to prevent the gasket from blowing out of the groove provided in the belled pipe end during use. The mechanism used to prevent blow-outs of this type should also be such that it does not interfere with bending of the gasket during initial insertion of the gasket into the raceway provided in the belled pipe end during the gasket installation operation.

FIG. 1 shows an improved sealing gasket of the invention, designated generally as 11. As can be seen in FIG. 1, the sealing gasket 11 is designed for insertion within an annular groove or raceway 13 provided within the mouth region 15 which forms a part of a "belled" end opening of a female ductile iron pipe 17. The gasket 11 is capable of sealing the female ductile iron pipe end to a mating male ductile iron pipe end 19 having an interior surface 21 and an exterior surface 23. While the raceway 13 may assume various shapes, in this case, the raceway has two regions of increased diameter 25, 27, as seen in the cross-sectional view of FIG. 1, separated by a region of lesser diameter 29, giving the annular groove a "dual pocket" appearance when viewed in cross-section. This particular raceway design is peculiar to ductile iron pipelines and can be easily distinguished from the typical raceways found in plastic pipelines which are often a single, arcuate groove.

As will be explained more fully in the discussion which follows, the nature of the materials used in forming the sealing gasket of the invention play a significant role in the functioning of the sealing system due to that fact that, unlike gaskets in the pipe sealing industry which are formed totally of a traditional elastomer, such as natural or synthetic rubber, the gasket of the invention has s "body" formed of a relatively softer (lower durometer) rubber which is reinforced by a hard "band" formed of a relatively harder synthetic plastic material (higher durometer), such as a polypropylene.

FIG. 1 shows the sealing gasket in place within a groove or raceway formed in the end of the female, belled pipe end. The sealing gasket must be formed of suitable materials which will allow the gasket body sufficient flexibility to allow it to be "bent" to be installed within the raceway, but be resilient enough to then return to its original shape. This can either be a hand assembly operation, or can be performed by a suitable automated assembly process. In other words, the gasket body is formed of a material which is more resilient or softer, while the plastic band is formed of a material which is relatively harder and less resilient. Resiliency is the capability of a strained body to recover its size and shape after deformation caused especially by compressive stress (Webster's New Collegiate Dictionary, 1976 edition, Merriam Company, Springfield, Mass.).

Thus, as shown in FIGS. 1-6, the annular gasket body (31 in FIG. 2) is made of a resilient elastomeric material, such as a suitable rubber. The elastomeric material might be, for example, a suitable commercially available EPDM having the desired rubber durometer. Generally, it has been found that gasket materials having durometer hardnesses less than about 40 Shore A have insufficient mass and rebound and will not provide an adequate seal for the types of sealing applications under consideration. On the other hand, it has been found, in general, that hardnesses greater than about 70 Shore A are too hard to form a proper gasket seal. Therefore, the softer material of the annular gasket body preferably has an ASTM hardness of about 40 to about 70 Shore A, and more preferably about 40 to about 60 Shore A.

As can be seen in FIG. 2, the annular gasket body has an inner circumferential region 33 and an outer circumferential region 35. The gasket body is also configured as a pair of lobes 53, 55, as viewed in cross-section in FIGS. 2 and 3. The lobes 53, 55, are partly separated by an insertion force reduction notch 37. The gasket body also has a circumferential groove 39 for receiving a mating circumferential reinforcement band 41. As can be seen in FIG. 1, the annular gasket body 11 is installed within the annular groove provided in the mouth region 15 of the female ductile iron pipe 19 so that the outer circumferential region forms a seal with the female pipe mouth region and the inner circumferential region forms a sealing surface for the exterior surface 23 of the mating male ductile iron pipe 19.

With further reference to FIGS. 2-6, there are shown some additional views of the sealing gasket of the invention with the special reinforcing band 41. The reinforcing band 41 acts to prevent the sealing ring from dislodging on insertion. It also saves on material costs, as will be explained more fully. The reinforcing band 41 has a circumferential body which is made of a synthetic polymer which has a greater hardness than the elastomeric material of the remainder of the gasket body.

Generally speaking, the relatively harder band 41 should be made of a harder, relatively rigid plastic.

A number of materials might meet these general characteristics. For example, polyolefins such as polypropylene or polyvinyl chloride (PVC) are two examples of synthetic plastics that might find application for this purpose. This combination of materials has advantages in terms of their chemical affinity and bonding abilities, as briefly mentioned. For reasons which should be apparent, the harder portion should be somewhat stiff and resistant to compression. Polyethylene is regarded as less suitable for the harder portion because of its greater compressibility than polypropylene and polyvinyl chloride. The harder material might even encompass such things as an acrylonitrile butadiene styrene (ABS) engineered plastic. The preferred polypropylene material is a high performance impact copolymer showing an appropriate stiffness for the application at hand. The material can be of higher durometer than the remaining portion of the gasket body since it does not participate in the sealing function of the gasket to the same extent as the main rubber "body" portion.

In the example illustrated, the gasket body may be formed of a synthetic rubber, such as an EPDM rubber, having a Shore A durometer on the order of 40-65 and the plastic reinforcing band may be formed of a synthetic plastic, such as polypropylene, having a Shore A durometer on the order of 75 to 95. The continuous polypropylene band 41 with its balanced stiffness supports the sealing ring in the raceway also allows ease of installation. The band and tab taper angle matches that of the raceway groove, contributing to seal stability and low stress in the band when pressure is applied. The band ID and tab height are also chosen so that the dimension "L" in FIG. 6 will avoid seal dislodgment in most joint dimensional scenarios.

Again with reference to FIGS. 2-6, the reinforcing band 41 can be seen to have a series of rigid tabs or ears (such as ears 43, 45 in FIG. 2) which extend outwardly from the circumferential body 41 of the band at a predetermined spacing which extends around the circumference of the body of the band. As viewed in cross-section in FIG. 2, the tabs have a bottom surface 45 which extends to an inner vertical sidewall 49 and an oppositely arranged outer vertical sidewall 47. The sidewall 49 is of greater relative height than the outer sidewall 47. The band also has a region of increased height 51 which helps to prevent seal extrusion under pressure conditions. This region 51 is received within the circumferential groove 39 of the sealing gasket elastomeric body, as has been discussed.

The remaining shape of the elastomeric rubber portion of the gasket body with its two lobes (53, 55 in FIG. 6) resembles the traditional Tyton® gasket which it is intended to replace. With respect to the imaginary line 57 in FIG. 6, the tapered removal of material might be used to lessen the overall amount of material used, according to mechanical performance needs. In FEA tests, due to material volume optimizations, strains through all of the rubber volume are maintained relatively low (below 70%) at maximum test pressures. Due to geometry optimization, the seal deformation is symmetric, and strains are very even (below 50%) through most of the rubber volume. (This condition is achieved after joint assembly).

Figure 7:
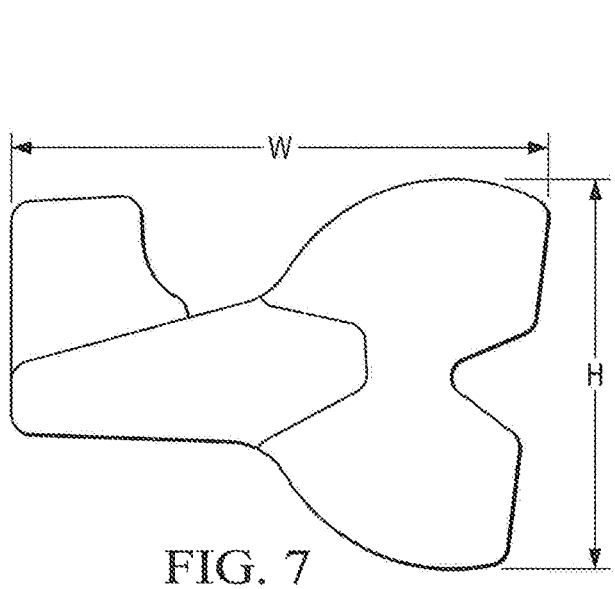
FIG. 7 and FIG. 8 are simplified cross-sectional views of the gasket of the invention and the traditional Tyton® gasket shown side-by-side for comparison purposes.
Figure 8:
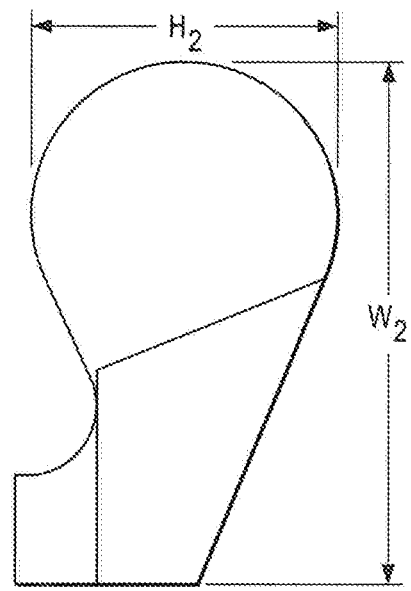

FIGS. 7 and 8 are simplified views of the improved sealing gasket of the invention (FIG. 7) as compared to a traditional Tyton® gasket (FIG. 8). The gasket of the invention shown in FIG. 7 is not drawn strictly to scale for ease of illustration purposes, but does show a drastic difference in overall size as compared to the Tyton® gasket. The actual comparative dimensions are as follows:

| OD | | Height "H" | | Width "W" | |
|---|---|---|---|---|---|
| Nom | Tolerance | Nom | Tolerance | Nom | Tolerance |
| Improved Gasket: | | | | | |
| 356.5 | −1.8 to 1.8 | 20.2 | −0.3 to 0.3 | 28.4 | −0.4 to 0.4 |
| Tyton ® Gasket: | | | | | |
| 364.00 | | 20.25 | | 34.0 | |

The sealing gasket of the invention thus has an overall seal volume and wherein the overall seal volume represents on the order of a 40% reduction in volume, or more, and consequently reduction in material cost, over a traditional Tyton® gasket. The material costs are further reduced due to the fact that polypropylene is less expensive than the rubber utilized.

The minimum volume of the product should be the same as the raceway groove volume. If a seal is made with a smaller volume than this, it would not be functional. This volume reduction can be achieved using the "V" groove region in the gasket body, by using a ribbed insert rather than a solid one, by making holes to reduce volume, or by any sort of interrupted or discontinued geometry to achieve the same purpose of volume reduction.

Figure 10:
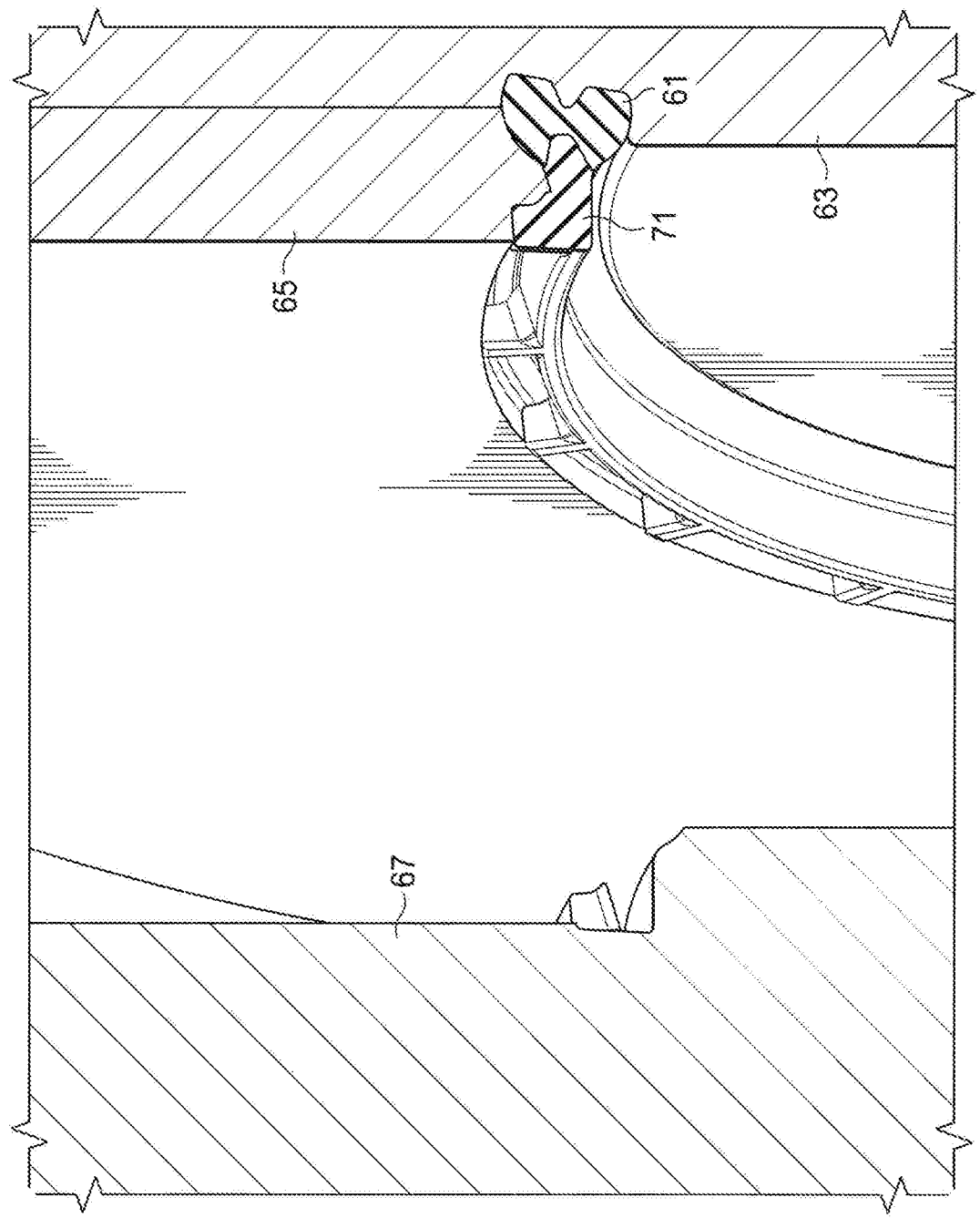
Figure 11:
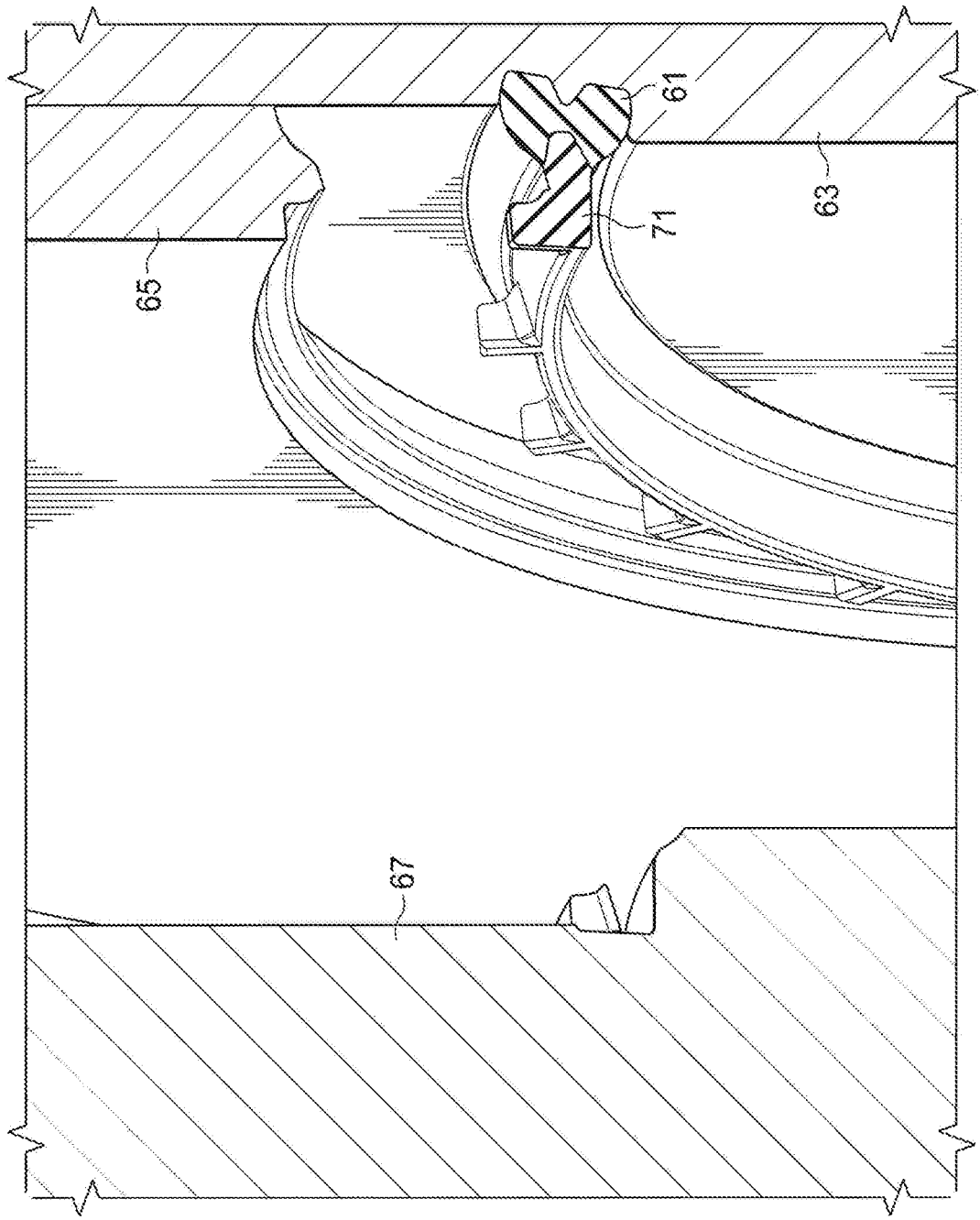

The manufacturing techniques used to manufacture the sealing gasket of the invention will now be described, primarily with reference to FIGS. 9-11. The first technique to be described uses plastic injection over a rubber part with chemical bonding between the two. Any of a number of known manufacturing processes can be used to bond the rubber and plastic portions of the gasket body. For example, overmolding is an injection molding process where one material (such as a hard plastic) is molded onto a second material (such as an EPDM rubber in this case). If properly seated, the overmolded part will form a strong bond with the rubber part. One advantage of this technique is that the use of primers or adhesives is no longer required to obtain an optimum bond between the materials. One type of overmolding is insert molding where a pre-molded insert is placed in a mold and the plastic is shot directly over it in a one-shot molding operation. Other conventional molding operations can be used in forming the two-part bonded gasket of the invention.

Figure 9:
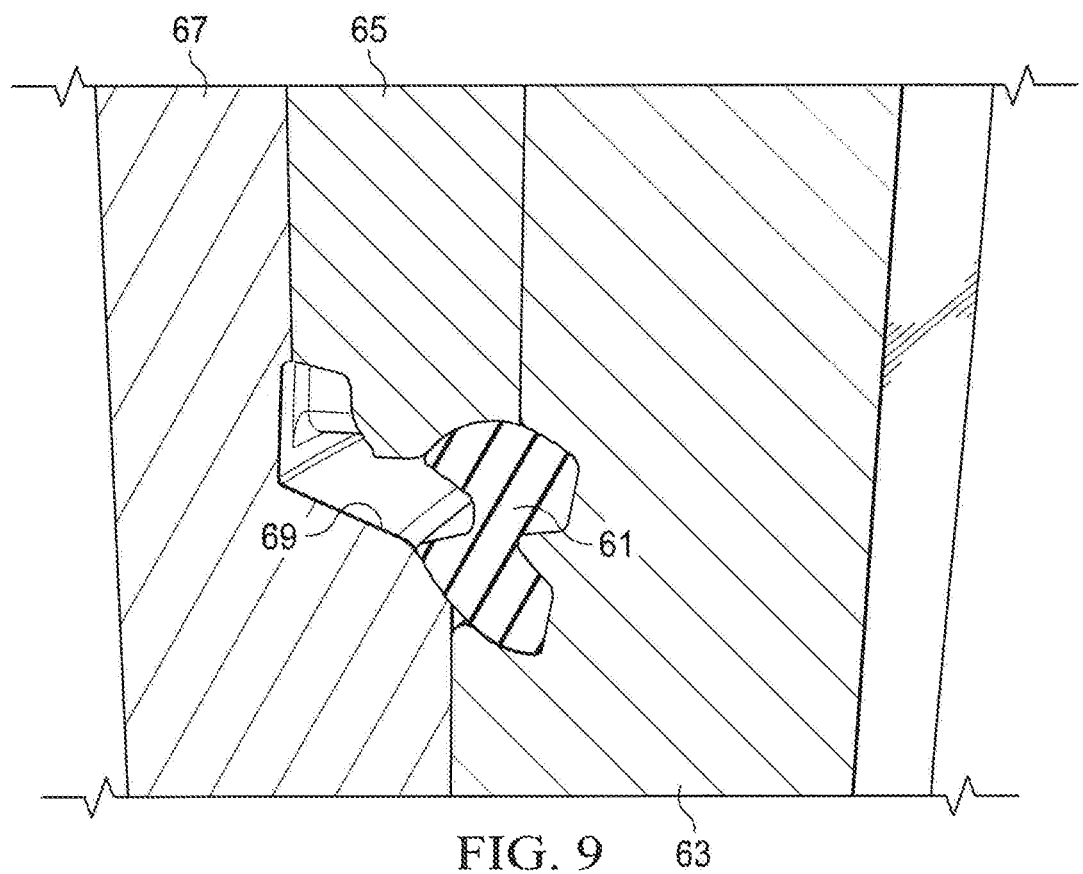
FIGS. 9-12 are simplified cross-sectional views of the gasket of the invention as it is being formed during a molding operating in which the regions of varying hardness are chemically bonded together.
Figure 9A:
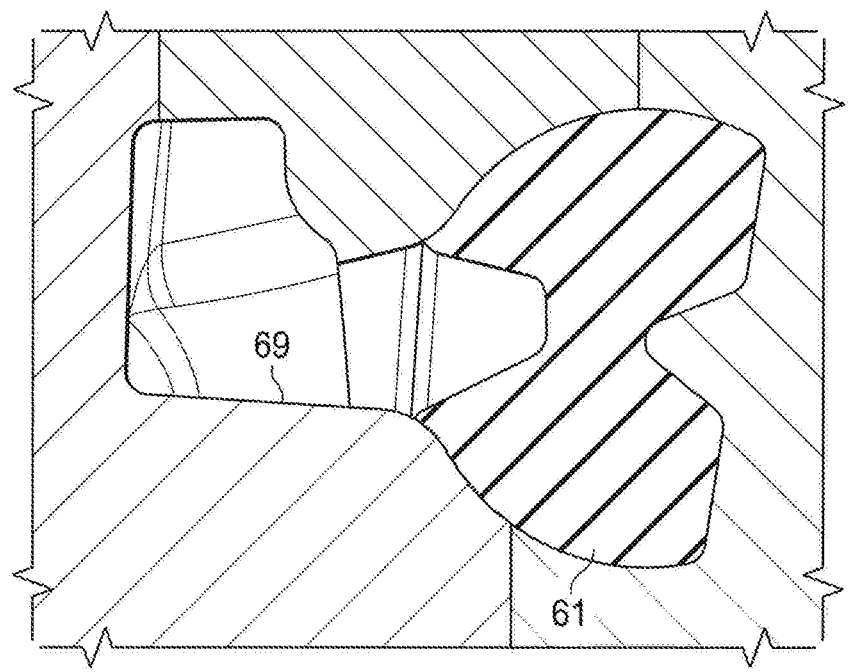
Figure 9B:
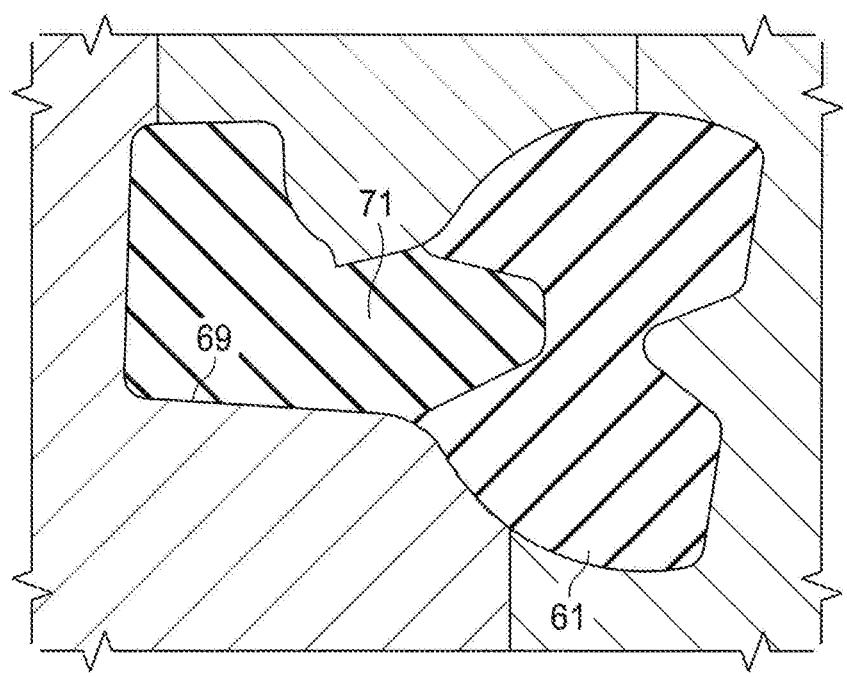

With reference to FIG. 9, a cooled down, previously molded and cured EPDM ring 61 is stretched and placed as an insert into a plastic mold on the plate 63 of the mold. As shown in FIG. 9, the middle (split) plate 65 and opposing hot plate 67 of the mold then close to form a cavity 69 for plastic injection. FIGS. 9A and 9B show the mold cavity in greater detail, with FIG. 9B showing the plastic portion 71 having been injected into the cavity 69 so that it chemically bonds with the rubber part. Continuing to FIG. 10, a partial sectional view of the cured sealing gasket of the invention is shown during the demolding process. In the first part of the process, both the plate 63 and the split plate 65 move together to the right, as viewed in FIG. 10. The hot plate 67 remains anchored at the hot platen (not shown) of the press. Next, the split plate 65 is actuated and moves upwardly, as show in FIG. 11, just before an ejection mechanism (not shown) at the ejection side, ejects the completed part (see FIG. 12).

Figure 12:
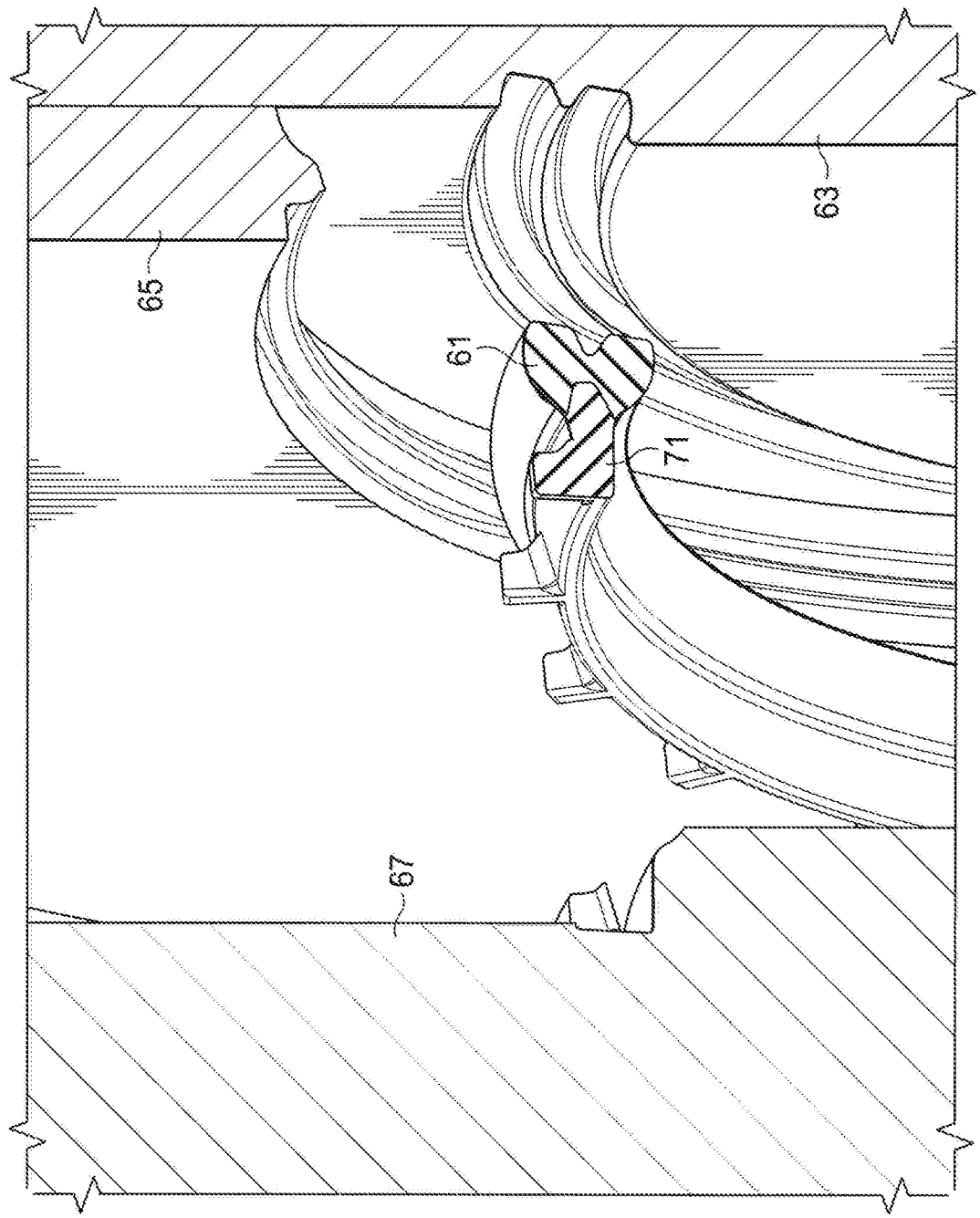
Figure 13:
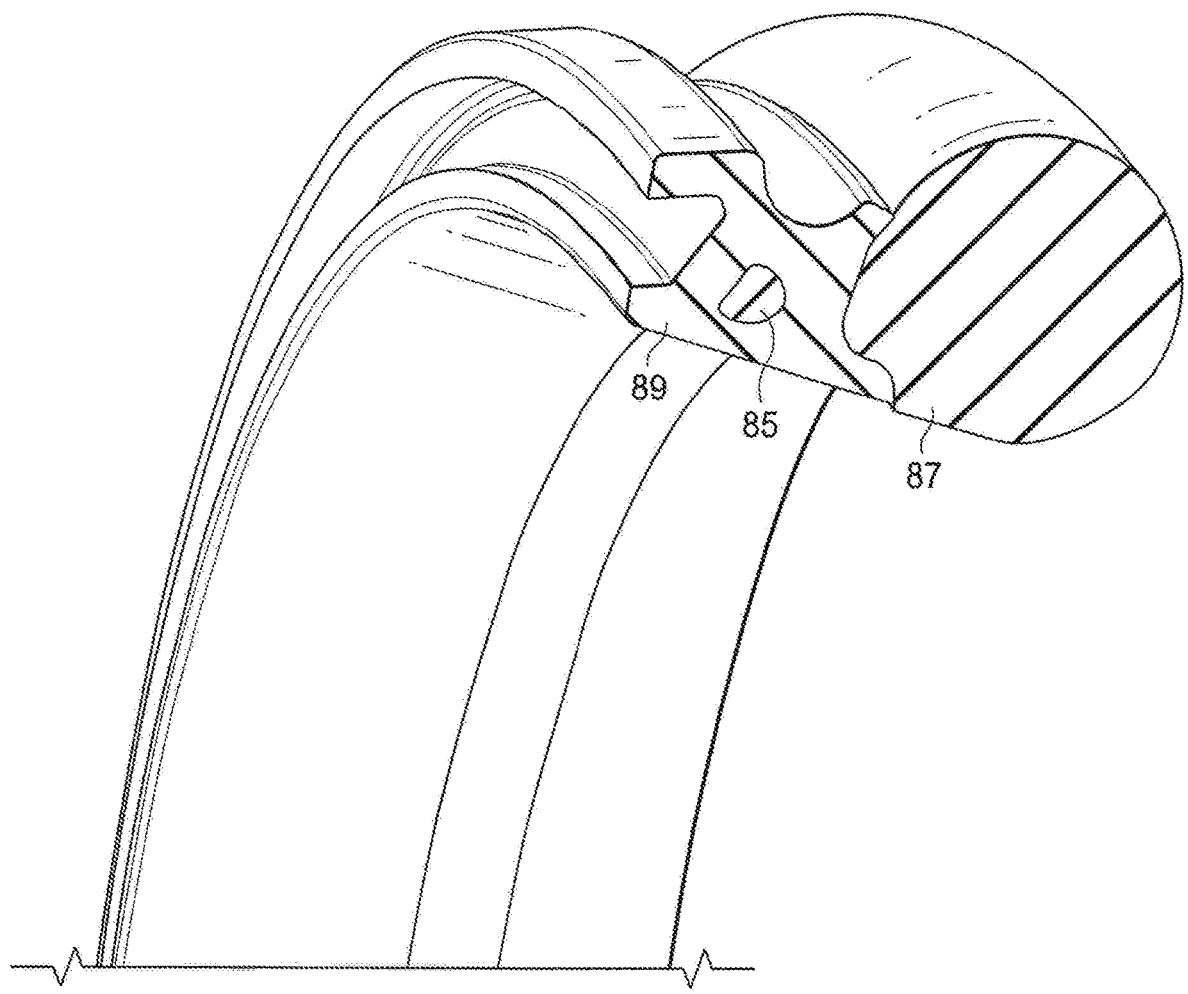

FIGS. 12A-13 illustrate an alternative manufacturing technique, in somewhat simplified, schematic fashion. This technique uses plastic injection over the rubber part with mechanical interlocking of the parts (no chemical bonding). The rubber portion of the gasket, in this case, is designed with a series of holes through which the plastic material will flow, creating a mechanical interlocking between the plastic portion and the rubber portion of the gasket. This process also allows for the use of less expensive plastic compounds, since no chemical affinity is required.

FIG. 12A shows the mold cavity 73 formed between the mold plates 75, 77, 79. FIG. 12B shows the rubber part 79 being loaded into the mold. FIGS. 12C and 12D show the injection of the plastic portion of the gasket. FIG. 12C shows the mold feature 81 which forms the hole (83 in FIG. 12D) for mechanically joining the rubber portion of the gasket. FIG. 13 is a partial cross-section view of a sealing gasket made by the second manufacturing technique, showing the rubber mass 85 which forms the mechanical interlock between the rubber portion 87 and the harder plastic portion 89 of the gasket.

While the invention has been described with respect to two manufacturing methods, it will be understood that the product could be made of two separated elements. The plastic and rubber components could be joined with any bonding agent using fixtures, robotics, or any type of modern manufacturing method which could be substituted for the over molded technique described above.

In operation, the gasket (11 in FIG. 1) of the invention is first installed within the raceway in the female, belled pipe end. FIG. 1 shows the beginning entry of the mating male pipe 19. The leading nose region 91 of the male pipe first makes contact with the hard plastic band portion 25 of the sealing gasket before contacting the annular gasket body 27 generally. As the male pipe continues to be inserted within the female belled pipe end, the nose region 91 of the male pipe and the male pipe exterior surfaces 23 contact the rubber, elastomer body region of the sealing gasket.

During the initial installation process of the sealing gasket within the raceway of the female pipe end, the gasket is bent and forced to conform to the annular groove. The rigid plastic portion of the gasket forces the gasket radially outward against the pipe as the male pipe end is inserted into the female belled pipe end. Due to its resiliency, the conformed exterior surface exerts pressure on the annular groove thus keeping the gasket securely in place. The presence of the relatively hard plastic band helps to firmly seat the gasket and to insure that the gasket body will not be blown out of the annular groove in use in the field. When internal pressure or external forces act on the pipe joint, the gasket reacts dynamically by absorbing the internal or external load and in turn exerts more pressure on the pipe joint to preserve the integrity of the seal.

An invention has been provided with several advantages. The improved gasket of the invention is capable of joining and securely sealing a section of ductile iron pipe to an adjacent ductile iron or plastic pipe section. The system of the invention is simple in design and economical to manufacture and does not require any drastic changes in existing ductile iron components. The special plastic band portion of the gasket helps to insure that the gasket is firmly held within the mating annular groove provided in the female belled pipe end, even in the presence of high pressure situations.

While the invention has been shown in several of its forms, it is not thus limited but is susceptible to various changes and modifications without departing from the spirit thereof.

What is claimed is:

1. A sealing gasket for insertion within a raceway provided within a mouth region located adjacent a belled end opening of a female ductile iron pipe capable of sealing the female ductile iron pipe to a mating male pipe having an interior surface and an exterior surface, the sealing gasket comprising:

an annular gasket body made of a resilient elastomeric material, the annular gasket body having an inner circumferential region and an outer circumferential region which form a pair of lobes, as viewed in cross-section, lobes being partly separated by an insertion force reduction notch, the gasket body also having a circumferential groove for receiving a mating circumferential reinforcement band, the annular gasket body being installed within the raceway provided in the mouth region of the female ductile iron pipe so that the outer circumferential region forms a seal with the female pipe mouth region and the inner circumferential region forms a sealing surface for the exterior surface of the mating male ductile iron pipe;

wherein the mating circumferential reinforcement band has a body which is made of a synthetic polymer which has a greater hardness than the elastomeric material of the remainder of the gasket body;

wherein the mating circumferential reinforcement band has a plurality of spaced rigid tabs which extend outwardly from the circumferential body of the band at a predetermined spacing which extends around the circumference of the body of the band, the tabs being received within a portion of the raceway provided within the mouth region located adjacent the belled end opening of the female ductile iron pipe end after installation, each of the tabs having a bottom surface which extends to an inner vertical sidewall and an oppositely arranged outer vertical sidewall; and wherein the raceway provided within the mouth region located adjacent the belled end opening of the female ductile iron pipe has two regions of increased diameter separated by a region of lesser diameter, giving the raceway a dual pocket appearance when viewed in cross-section, and wherein the outer circumferential region of the gasket body fits in one pocket and the tabs of the reinforcing ring mating circumferential reinforcement band are received in the other respective pocket when the gasket is assembled in the raceway.

2. The sealing gasket of claim 1, wherein the resilient elastomer used to form the annular gasket body is an EPDM rubber.

3. The sealing gasket of claim 1, wherein the mating circumferential reinforcement band is formed of polypropylene.

4. The sealing gasket of claim 1, wherein the sealing gasket has an overall seal volume and wherein the overall seal volume represents at least a 40% reduction in volume, and consequently reduction in material cost, over traditional ductile iron gaskets which were comprised entirely of a homogeneous rubber body.

5. A sealing gasket for insertion within a raceway provided within a mouth region located adjacent a belled end opening of a female ductile iron pipe capable of sealing the female ductile iron pipe to a mating male pipe having an interior surface and an exterior surface, the sealing gasket comprising:

an annular gasket body made of a resilient elastomeric material, the annular gasket body having an inner circumferential region and an outer circumferential region which form a pair of lobes, as viewed in cross-section, lobes being partly separated by an insertion force reduction notch, the gasket body also having a circumferential groove for receiving a mating circumferential reinforcement band, the annular gasket body being installed within the raceway provided in the mouth region of the female ductile iron pipe so that the outer circumferential region forms a seal with the female pipe mouth region and the inner circumferential region forms a sealing surface for the exterior surface of the mating male ductile iron pipe;

wherein the mating circumferential reinforcement band has a body which is made of a synthetic polymer which has a greater hardness than the elastomeric material of the remainder of the gasket body;

wherein the mating circumferential reinforcement band has a plurality of spaced rigid tabs which extend outwardly from the circumferential body of the band at a predetermined spacing which extends around the circumference of the body of the band, the tabs being received within a portion of the raceway provided within the mouth region located adjacent the belled end opening of the female ductile iron pipe after installation, each of the tabs having a bottom surface which extends to an inner vertical sidewall and an oppositely arranged outer vertical sidewall;

wherein the raceway provided within the mouth region located adjacent a belled end opening of the female ductile iron pipe has two regions of increased diameter separated by a region of lesser diameter, giving the raceway a dual pocket appearance when viewed in cross-section, and wherein the outer circumferential region of the gasket body fits in one pocket and the tabs of the reinforcing ring mating circumferential reinforcement band are received in the other respective pocket when the gasket is assembled in the raceway; and wherein the body of the mating circumferential reinforcement band has a rearwardly extending body portion which is received and bonded within the circumferential groove of the gasket body, the increased height of the rearwardly extending body portion serving to help prevent extrusion of the sealing gasket under pressure.

6. The sealing gasket of claim 1, wherein the annular gasket body is chemically bonded to the reinforcing ring.

7. The sealing gasket of claim 1, wherein the mating circumferential reinforcement band is mechanically interlocked with the annular gasket body with no chemical bonding.

\* \* \* \* \*